L. J. LARSON.
TENSIOMETER.
APPLICATION FILED APR. 2, 1918.
1,322,123.
Patented Nov. 18, 1919.
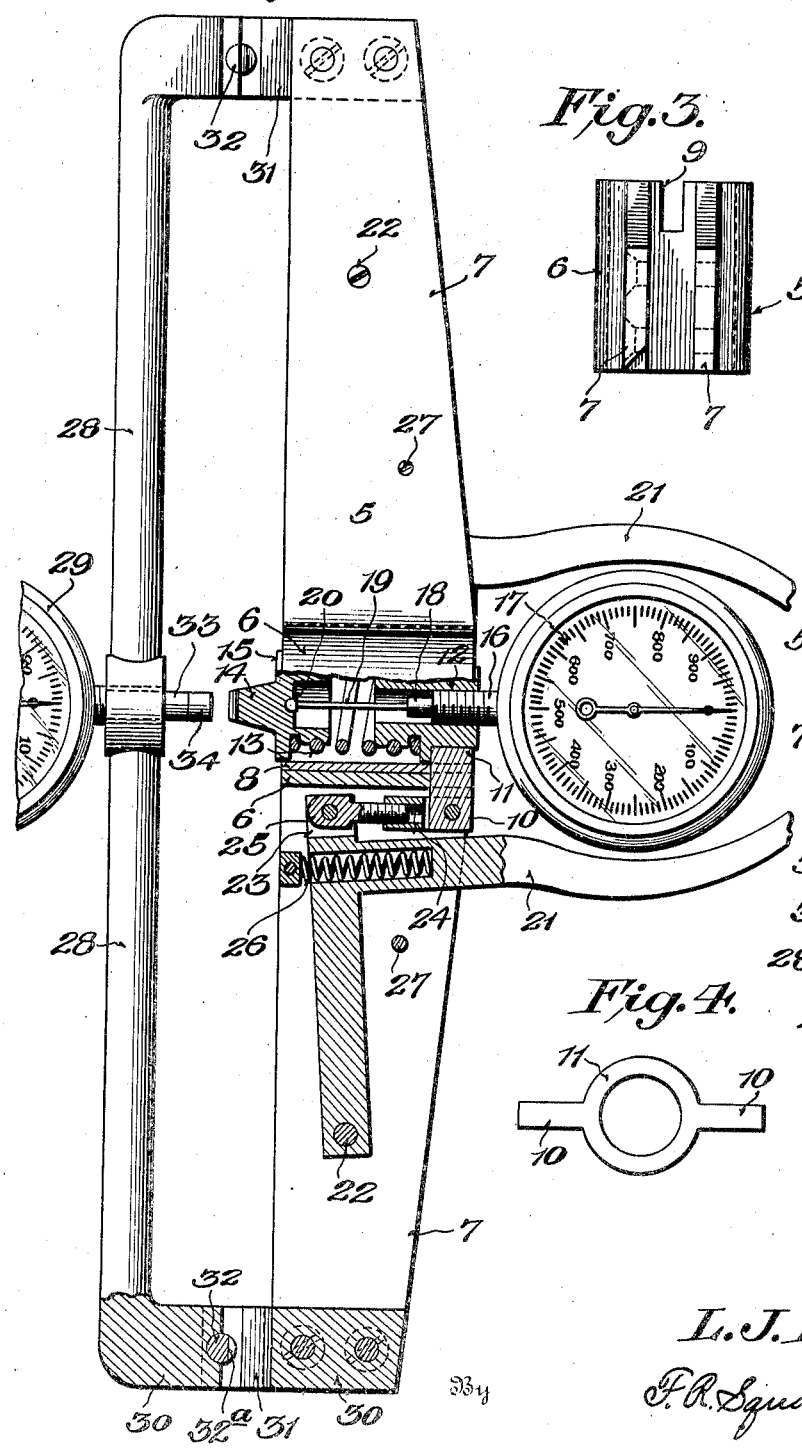
Inventor
L. J. Larson,
F. R. Squair,
Attorney

UNITED STATES PATENT OFFICE.

LOUIS J. LARSON, OF WASHINGTON, DISTRICT OF COLUMBIA.

TENSIOMETER.

1,322,123.  Specification of Letters Patent.  Patented Nov. 18, 1919.

Application filed April 2, 1918. Serial No. 226,157.

*To all whom it may concern:*

Be it known that I, LOUIS J. LARSON, a citizen of the United States, residing at Washington, in the District of Columbia, have invented new and useful Improvements in Tensiometers, of which the following is a specification.

This invention relates to instruments for measuring the tension in stretched wires, cords, and the like, and is designed primarily for determining the initial tension in the stay wires of airplanes.

In an attempt to reduce the weight of airplanes to an absolute minimum the factor of safety of many of the members has been greatly decreased. Since in many cases the stress set up in the members by the initial tension in the stay wires is a large percentage of the total stress to which they are subjected, it is important to know the magnitude of this tension. So far as is known, no satisfactory instrument for determining the initial load on stay wires has been devised. The methods now employed are very crude and cumbersome and the results obtained are only approximate. One of the sound methods is said to give reliable results but it requires an observer with a highly musically trained ear. The tensiometer forming the subject matter of the present invention was designed to provide an easy method for measuring tension; the new instrument requires almost no skill or experience to operate and gives results that are well within the degree of accuracy required for practical purposes.

One embodiment of my invention is shown in the accompanying drawings in which,—

Figure 1 is a front elevation, partly in section, with the ends of the levers and part of the lower dial broken away;

Fig. 2 is an end view of the instrument;

Fig. 3 is an end view of the main frame before the parts are assembled, and

Fig. 4 is a top view of the spring yoke.

The new instrument consists of a main frame 5 having a cylindrical body portion 6 and parallel extensions 7 spaced apart as shown in Fig. 3. The body portion 6 has a bore in which a guide sleeve 8 fits tightly. The part 6 and guide sleeve 8 have registering slots 9 for the reception of the arms 10 of a spring yoke 11. An upper spring plug 12 is inserted in the yoke 11 and carries a spring 13 which in turn is secured at its lower end to the lower spring plug 14, forming a spring plunger. A flange 15 on the spring plug 14 is shaped to fit and slide through the guide sleeve 8.

In the upper spring plug 12 there is screwed the stem 16 of a dial or indicator 17. The plunger 18 of the dial has a rod or wire 19 depending therefrom which is provided with a spherical end 20 seated in a socket in the plug 14.

Levers 21, located between the extensions of the main frame, are pivoted at 22 and have their ends 23 connected with the arms 10 of the spring yoke by link forks 24 and link screws 25, thereby permitting any desired adjustment between the arms 10 and the ends 23 of the levers. The levers 21 are normally held in their upper positions by return springs 26, the upward movement being limited by the stop pins 27.

A dial yoke 28, carrying a dial or indicator 29, has extensions 30 which are inserted between the ends of the extensions 7 of the main frame and are secured thereto by countersunk screws. The extensions 30 are provided with recesses 31 (see Fig. 2); holes pass transversely through the extensions 30 and register with a groove in the bottom of each recess, thereby providing for the reception of pins 32 which are cut away at 32ª to provide supports for the wire whose tension is to be measured. The pins 32 fit tightly in the grooves and holes provided for them. The plunger 33 of the lower dial has a dial extension 34 screwed thereto.

Dials are used, such as Ames dials, which will measure small movements accurately. The lower dial has a scale, each division of which represents .001 of an inch. The upper dial indicates the pressure applied.

The principle on which the design of the instrument is based is well known. In any balanced systems of forces acting on a point the resultant is zero. If a wire is supported on two points and deflected at the middle of the span thus formed, there exists a system of forces in equilibrium, and if the length of span, the amount of deflection at the center, and the force required to produce this deflection be known, it is possible to calculate the tension in the wire. The new instrument furnishes a convenient method of obtaining the necessary data for this solution, as will be evident from the following description of the mode of operation.

The wire whose tension is to be measured such as the taut stay wire of an airplane, is supported on the pins 32. The plunger of the lower dial 29 is so adjusted that it will press lightly against the wire when in this position. The position of the pointer of the dial 29 is noted at this time and then the levers 21, which are grasped by the operator, are slowly pressed together until the pointer of the dial 29 has made a complete revolution corresponding to a deflection of the wire of .1 of an inch. When the levers 21 are pressed together against the upward pressure of the springs 26, the yoke 11 is caused to slide downward in the guide sleeve 8 carrying with it the upper and lower plugs 12 and 14 and the spring 13. The relative positions of the plugs 12 and 14 remain unchanged until the lower end of the plug 14 touches the wire. With a further increase of pressure on the levers 21 a downward pressure is exerted on the wire through the spring 13. Since the extent to which the spring is compressed is a function of the force exerted through the spring the measurement of this compression by the upper dial will at the same time indicate the lateral force exerted on the wire. If the wire is always deflected a given amount, the tension in the wire will be proportional to the load of the spring and it is possible to make the upper dial indicate the tension directly. It will be seen that the extent of the deflection of the wire is not a function of the tension of the wire, the deflection being produced independently of said tension. The instrument is preferably so designed that when the wire is deflected .1 of an inch as shown by the lower dial, one complete turn of the upper dial, that is a compression of .1 of an inch in the spring, corresponds to a tension of 1000 pounds on the wire. Using a dial with a thousand divisions, the position of the pointer on the upper dial indicates pounds of tension on the wire. It follows that when operating at the maximum load for which the instrument is ordinarily designed, that is 1000 pounds, each dial moves the same amount so that the load and the deflection on the wire can be read with the same degree of accuracy.

To take a reading of the tension in a wire, it is only necessary to place the instrument in position on the wire, close the levers until the lower dial indicates deflection of .1 of an inch, one turn of the dial, and note the movement of the upper dial. The levers are then released and the instrument removed. The brief period of time required to take a reading is a great advantage especially where a very large number of wires are to be tested.

There are two sources of error inherent in the method; these are beam action and the actual lengthening of the wire due to deflection from a straight line. The latter source of error is negligible especially in those cases in which the total length of the wire is relatively large as compared with the gage length of the instrument; the amount of this error is very greatly reduced if the ends of the wire yield, as they will undoubtedly do in an airplane.

For a high degree of accuracy a correction is necessary for the error arising from beam action. Where the instrument is to be used on wires of about the same diameter the amount of this error may be readily determined and the instrument adjusted so that the proper correction is automatically applied, permitting the actual tension to be read directly on the upper dial.

Although I have described in considerable detail one embodiment of my invention, it will be understood that various changes and modifications may be made without departing therefrom.

I claim:—

1. A device for measuring the tension in a stretched object comprising in combination two supports for the object to be tested, means for applying a load laterally to said object intermediate said supports and independently of the tension in said object, means for measuring the magnitude of said load, and means directly for measuring the extent of deflection of the object caused by said load.

2. A device for measuring the tension in a stretched wire comprising a frame, a support for the wire at each end of said frame, means located in about the middle part of said frame for applying a load laterally to said wire to cause a deflection thereof, means carried by said frame for directly measuring the magnitude of said load, and means also carried by said frame for measuring the deflection of the wire.

3. A device for measuring the tension in a stretched wire comprising an elongated frame, a support for the wire at each end of the frame, a spring plunger slidably mounted in the middle part of the frame, means for pressing said spring plunger against the wire, means carried by the spring plunger for measuring the amount of pressure imparted to the spring, and means carried by said frame for directly measuring the extent of the resulting deflection of the wire.

4. A tension-measuring device comprising an elongated frame, a support for the object to be tested at each end of the frame, a spring plunger slidably mounted in the frame about midway between the supports, levers pivoted in the frame and connected to said spring plunger for pressing the latter against the object to be tested, a pressure indicator carried by said plunger for registering the pressure imparted to the spring, and a device carried by the frame and opposite said spring plunger for measuring the resulting deflection of the object.

5. A device for measuring the tension in a stretched wire comprising a main frame, a dial-carrying member spaced away from the main frame and attached to each end of said frame, said member, near its junctures with the main frame, being shaped to provide supports for the wire, a spring plunger, comprising upper and lower spring plugs secured to, and spaced apart by, a spring, slidably mounted in the middle part of the main frame, hand levers pivoted in the main frame and adjustably connected with the spring plunger for applying pressure thereto, and a pressure indicator carried by the spring plunger.

6. In a device for measuring the tension in a stretched wire or the like, the combination with means for supporting the wire at points a known distance apart, and means for laterally applying pressure to the wire, of means for directly measuring the resulting deflection of the wire through a given distance and an indicator calibrated to register the tension in the wire when the latter has been deflected through said given distance.

7. In a device for measuring the tension in a stretched wire or the like, the combination with a frame providing at its ends supports for the wire and having a spring plunger slidably mounted in the middle part thereof, of hand levers pivoted in the frame and linked to said plunger and having their fulcrums so disposed that the plunger is moved toward the position normally occupied by the wire when said levers are pressed toward each other.

8. In a device for measuring the tension in a stretched wire or the like, the combination with a frame providing at its ends supports for the wire and having a spring plunger slidably mounted in the middle part thereof, of an indicator carried by the plunger for registering the tension in the wire when the latter is deflected through a given distance by a movement of the plunger, and hand levers pivoted in the frame and linked to said plunger and having their fulcrums so disposed that the plunger is moved toward the position normally occupied by the wire when said levers are pressed toward each other.

9. In a device such as that specified in claim 7, adjustable links connecting the levers with the spring plunger whereby the lengths of the links may be varied.

10. In a device such as that specified in claim 7, return springs having their lower ends pressing against the frame and their upper ends pressing against the levers for returning the levers to their non-operating positions when the pressure exerted by the operator is removed.

11. In a device such as that specified in claim 6, a spring plunger for transmitting pressure to the wire comprising upper and lower spring plugs secured to the opposite ends of a spring, an indicator rigidly mounted in the upper spring plug, an indicator plunger extending into a bore in said upper plug, and a slender rod or wire fastened to, and depending from, the indicator plunger and having a spherical end adapted to fit into a socket in the lower spring plug, whereby a movement of the plugs toward each other, coincident with a compression of the spring, will move the indicator plunger and actuate the indicator.

12. In a device for measuring the tension in a stretched wire or the like, the combination with a frame carrying at its ends supports for the wire, of means fulcrumed between said supports for causing a deflection of the wire and an indicator, and intermediate means actuated by said deflecting means adapted to be displaced by an amount proportional to the force exerted in producing said deflection.

13. In a device for measuring the tension in a stretched wire or the like, the combination with a frame carrying at its end supports for the wire and having a plunger located between said supports and movable in a direction substantially perpendicular to the line connecting said supports, of hand levers pivoted in the frame and in operative relation with said plunger and having their fulcrums so disposed that the plunger is moved when said levers are pressed toward each other.

14. A device for measuring the tension in a stretched object comprising relatively-fixed supports for the object to be tested, means for producing lateral deflection independently of the tension in the object, means for measuring the magnitude of the load required to produce such deflection, and means for directly measuring the extent of said deflection, said load being primarily produced by the tension in said stretched object.

15. In a device for measuring the tension in a stretched object, spaced-apart relatively fixed supports for the object to be tested, movably-mounted means supported independently of said object for deflecting the object through a prescribed distance and mechanism for directly measuring the extent of the deflection and the magnitude of the load on said object.

16. In a device for measuring the tension in a stretched object, a frame having supports for the object, means for applying a load to said object, said means embodying pivotally mounted levers, and an indicator coöperable with said levers and load-applying means.

17. A device for measuring the tension in a stretched object, the same comprising relatively fixed supports for the object, means supported independently of said object for deflecting the object through a prescribed distance, and means for directly measuring the extent of deflection of said object.

18. A device for measuring the tension in a stretched object, the same embodying relatively fixed supports for the object, means supported independently of said object for deflecting the object through a prescribed distance, means for directly measuring the extent of the deflection of said object, and means for positively determining the magnitude of the load.

19. A device for measuring the tension in an object under stress, the same comprising relatively fixed supports for the object, means supported independently of said object for deflecting said object, said means being unaffected by the tension in said object, and means for directly measuring the deflection of said object and the magnitude of the lateral load thereon.

20. A device for measuring the tension in a stretched object, the same comprising relatively fixed supports, manually-operable movably mounted means for deflecting the object, and means for directly measuring the extent of deflection and positively determining the magnitude of the load.

21. In a device for measuring the tension in a stretched object, a frame having supports for the object, means for applying a load to said object, said means embodying pivotally-mounted levers, and a load-indicator operable by the pressure of the object thereagainst.

In testimony whereof I affix my signature.

LOUIS J. LARSON.